(12) United States Patent
Knight

(10) Patent No.: US 6,764,051 B2
(45) Date of Patent: Jul. 20, 2004

(54) MOVING YOKE

(76) Inventor: Richard Knight, 29 Leybourne Avenue, Bournemouth, Dorset (GB), BH10 6ES (*) Notice: Subject to any disclaimer, the term of this patent is extended or adjusted under 35 U.S.C. 154(b) by 0 days.

(21) Appl. No.: 10/058,769

(22) Filed: Jan. 30, 2002

(65) Prior Publication Data

US 2003/0141420 A1 Jul. 31, 2003

(51) Int. Cl.⁷ .................................................. A47K 1/40
(52) U.S. Cl. ........................ 248/128; 248/138; 248/137; 248/141; 248/425; 248/174.1; 248/183.1; 248/184.1; 464/106; 362/418; 362/419; 362/412
(58) Field of Search ................................ 248/138, 128, 248/137, 141, 425, 174.1, 183.1, 184.1, 186.1; 464/106; 362/418, 419, 412, 425, 434, 420; 343/882, 767, 766, 761

(56) References Cited

U.S. PATENT DOCUMENTS

| | | | | | |
|---|---|---|---|---|---|
| 2,512,636 A | * | 6/1950 | Flynt | ............................ | 74/1 R |
| 3,728,541 A | * | 4/1973 | Rabinovich et al. | ........... | 378/77 |
| 4,016,420 A | * | 4/1977 | Rieder | .......................... | 378/77 |
| 4,282,529 A | * | 8/1981 | Speicher | ...................... | 343/765 |
| 4,426,578 A | * | 1/1984 | Bradcovich et al. | .... | 250/363.08 |
| 4,503,331 A | * | 3/1985 | Kovacs et al. | .......... | 250/363.04 |
| 4,878,393 A | * | 11/1989 | Duta et al. | ................ | 74/490.06 |
| 4,937,587 A | * | 6/1990 | Tsuda | .......................... | 343/765 |
| 5,690,420 A | * | 11/1997 | Saldana, Sr. | ................ | 362/540 |
| 6,531,990 B2 | * | 3/2003 | Verkerk | ....................... | 343/882 |

FOREIGN PATENT DOCUMENTS

| | | | | |
|---|---|---|---|---|
| DE | 2720344 | | 11/1978 | |
| FR | 1016775 A | * | 11/1952 | |
| FR | 2222730 A | * | 11/1974 | ........... F16M/11/12 |
| GB | 1188578 | | 4/1970 | |
| GB | 1406077 | | 10/1975 | |
| GB | 2353206 A | * | 2/2001 | ........... F21V/21/30 |

* cited by examiner

Primary Examiner—Kimberly Wood
(74) Attorney, Agent, or Firm—Young & Thompson

(57) ABSTRACT

A moving yoke comprises a first yoke member, a second yoke member, swivellable relative to the first yoke member about a first axis, and a third yoke member having an arcuate portion. The second yoke member has an arcuate support portion, and the arcuate portion of the third yoke member is supported by the arcuate portion of the second yoke member to enable slidable movement relative thereto along an arcuate path.

15 Claims, 8 Drawing Sheets

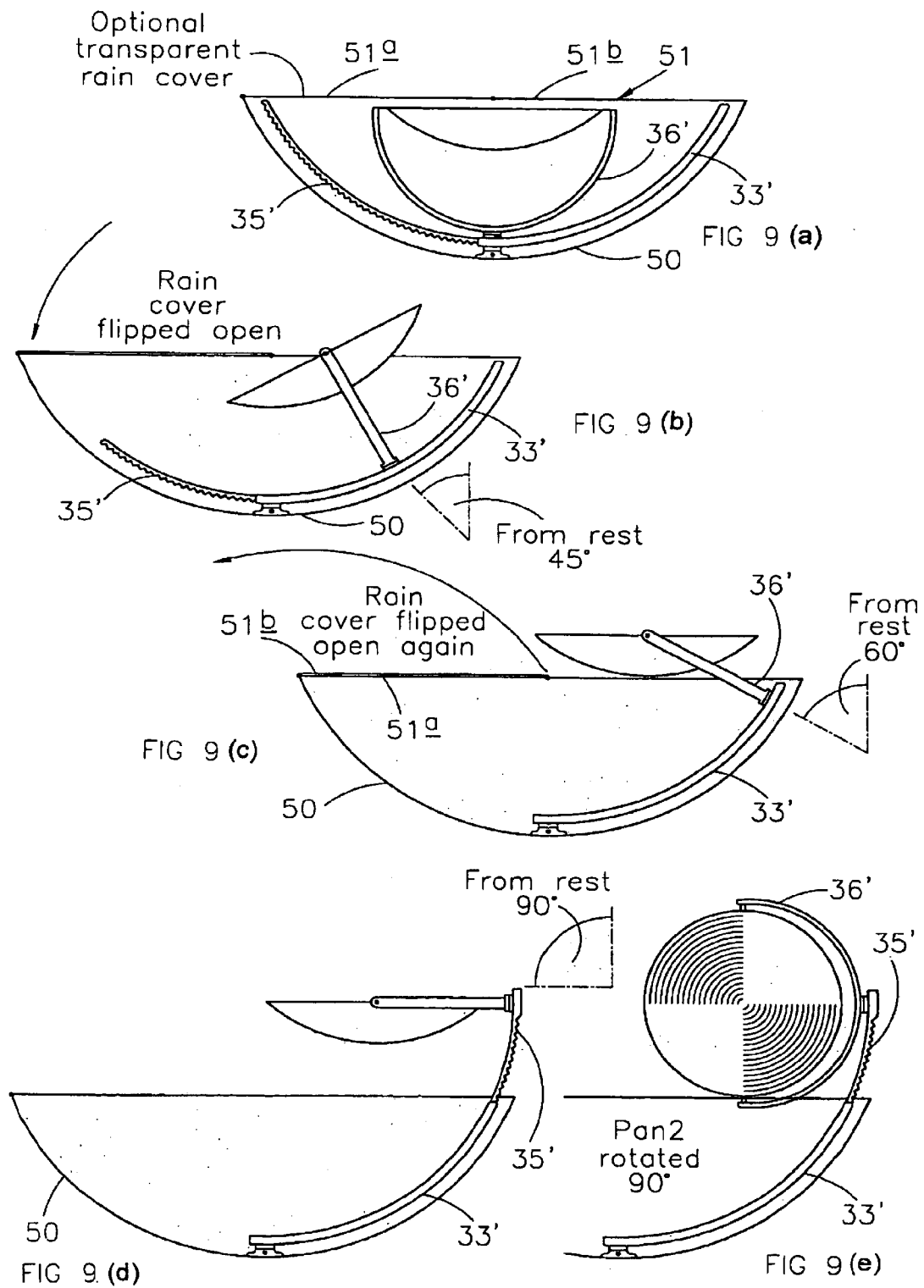

US 6,764,051 B2

MOVING YOKE

This invention relates to a moving yoke, particularly but not exclusively for supporting a light, mirror, television monitor, camera or any other device for sending or receiving electromagnetic radiation.

BACKGROUND TO THE INVENTION

It is known to provide automated lighting including a moving yoke to support the light source. The yoke of this known lighting comprises a platform swivellable about a vertical axis through 360° and support arms upstanding from the platform which support a housing containing a light source for pivotable movement through less than 360° about a horizontal axis. This yoke allows a light source to be swivelled through 360° with the swivel axis extending in a plane which bisects the light source and also allows the light source to be pivoted about the horizontal axis.

The present invention seeks to provide a more versatile yoke which allows additional movements to take place.

SUMMARY OF THE INVENTION

According to the present invention there is provided a moving yoke comprising a first yoke member, a second yoke member swivellable relative to the first yoke member about a first axis, the second yoke member having an arcuate support portion, and a third yoke member having an arcuate portion, which is supported by the arcuate portion of the second yoke portion to enable slidable movement relative thereto along an arcuate path.

Preferably, the third yoke member also has means for supporting an object, such as a light, for pivotable movement about a second axis. In this case, conveniently, the third yoke member can be arranged in a position relative to the second yoke member such that the second axis is perpendicular to, and coplanar with, the first axis and can be moved from this position through an arcuate path of 90° in order to bring the second axis parallel to, and offset from, the first axis.

Preferably, the yoke includes means, typically in the form of electric motors, for power operably swivelling the second yoke member relative to the first yoke member about said first axis, for sliding the arcuate portion of the third yoke member relative to the arcuate portion of the second yoke member and, where the third yoke member has support means, for pivoting the support means about said second axis.

Conveniently, the third yoke member includes an arcuate rack engageable with at least one pinion gear which can be rotated to move the third yoke member relative to the second yoke member along said arcuate path. In this case the pinion gear is, preferably, rotatable by an electric motor supported by the second yoke member.

The third yoke member may comprise two parts rotatable relative to one another. In this case, one part may include the rack and the other part may include the support means.

In one embodiment, the support means of the third yoke member supports a light source.

The invention will now be more particularly described, by way of example, with reference to the accompanying drawings.

DETAILED DESCRIPTION OF THE EMBODIMENTS

Figure 1:
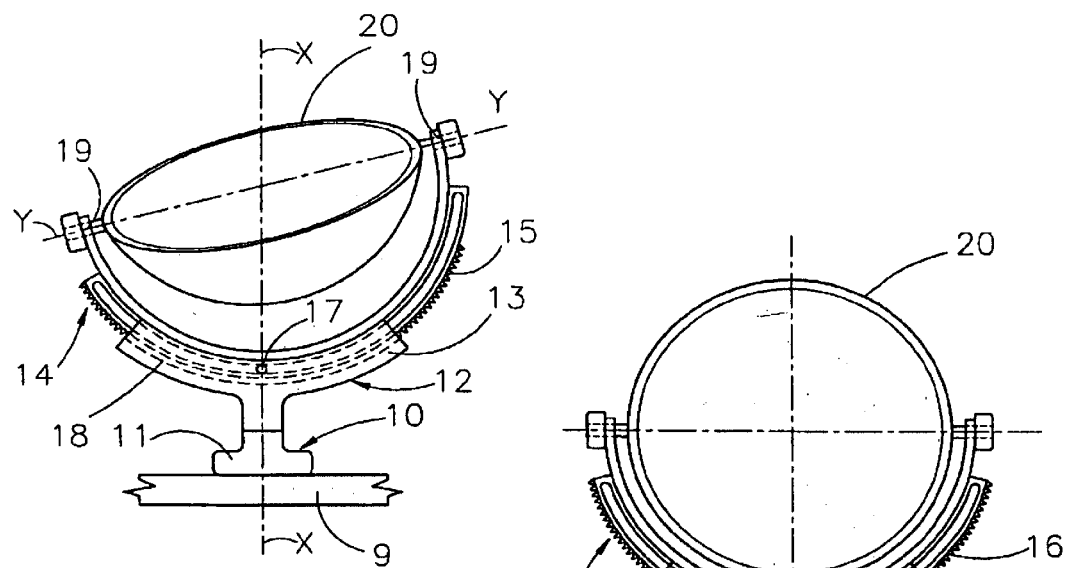
FIG. 1 is a side view of one embodiment of a moving yoke according to the invention, the moving yoke being shown supporting a light source in a first position.
Figure 2:
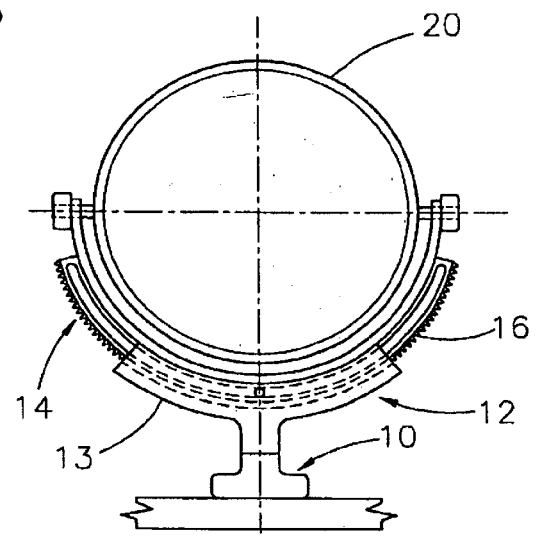
FIG. 2 is a view similar to FIG. 1, but showing the light source in a second position.
Figure 3:
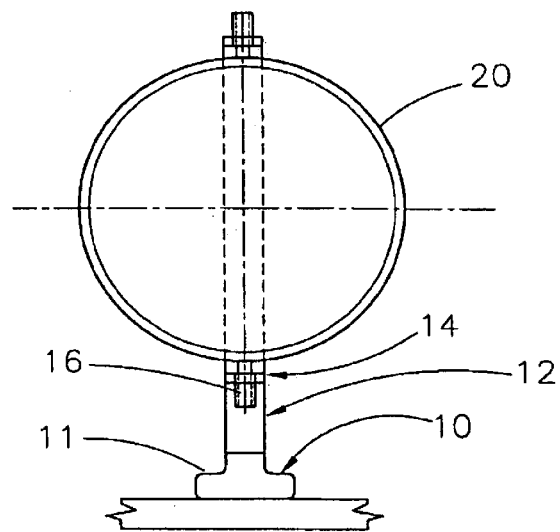
FIG. 3 is an end view of the moving yoke shown in FIGS. 1 and 2 with the light source in the position shown in FIG. 1 relative to the third yoke member and with the third yoke member displaced through 90° relative to the second yoke member.

Referring firstly to FIGS. 1 to 3 of the drawings, there is shown therein a moving yoke comprising a first yoke member 10 having a base 11 for attaching the moving yoke to a support surface 9, bracket, or the like.

The moving yoke also comprises a second yoke member 12 which is swivellable relative to the first yoke member 10 about a first axis X through 360°. The second yoke member 12 includes an arcuate rocker arm 13.

The moving yoke also comprises a third yoke member 14 having an arcuate slider 15, which is supported by the arcuate rocker arm 13 of the second yoke member 12 for slidable movement relative thereto along an arcuate path. The third yoke member 14 also includes support means 19 supporting an object such as a light 20, a mirror (not shown), a television monitor (not shown), or a camera (not shown) for pivotable movement about a second axis Y.

The three yoke members are movable relative to one another by power operated means. The power operated means are, preferably, in the form of electric motors, typically PMDC motors. A first motor (not shown) swivels the second yoke member 12 relative to the first yoke member 10 through 360°. A second electric motor (not shown) moves the slider 15 relative to the rocker arm 13 along the arcuate path and a third electric motor (not shown) pivots the light 20 about the second axis Y through 360°.

The rocker arm 13 is typically of U-shaped channel section (as shown in FIG. 3) and the arcuate slider 15 is typically of T-shaped section (as shown in FIG. 3) with the leg of the T-shaped slider extending into the channel-shaped section of the rocker arm 13. The free end of the leg of the T-shaped slider is typically provided with a rack 15 which engages with a pinion gear (not shown) rotated by the second electric motor which is supported by the second yoke member 12. As such, the rocker arm 13 of the second yoke member 12 extends in parallel or substantially in parallel with the slider 15 of the third yoke member 14.

Additionally, the slider 15 is guided for movement relative to the rocker arm 13 such as by pins 17 which project from opposite sides or the leg of the T-shaped slider and which extend into arcuate slots 18 in the side walls of the channel-shaped section of the rocker arm 13. Alternatively, in order to provide a greater degree of movement of the slider 15 relative to the rocker arm 13, the rocker arm 13 (or the slider 15) may be provided with arcuate rails which co-operate with arcuate slots extending along the slider 15 (or rocker arm 13).

The moving yoke described above is more versatile than hitherto known yokes. Not only can it swivel the light source 20 about the axis X through 360°, but it can pivot the light source about the axis Y through 360° and it can move the two axes X and Y relative to one another by moving the slider 15 relative to the rocker arm 13.

In the embodiment shown, when the slider 15 is arranged symmetrically with respect to the rocker arm 13, the axis Y is at right angles to, and coplanar with, the axis X. If the slider 15 is moved through 90° relative to the rocker arm 13 in one or other direction, the axis Y is displaced so as to lie parallel with the axis X and be offset therefrom. An infinite number of intermediate positions are also possible.

Movement of the yoke members relative to one another can be effected by computerised control.

Figure 4:
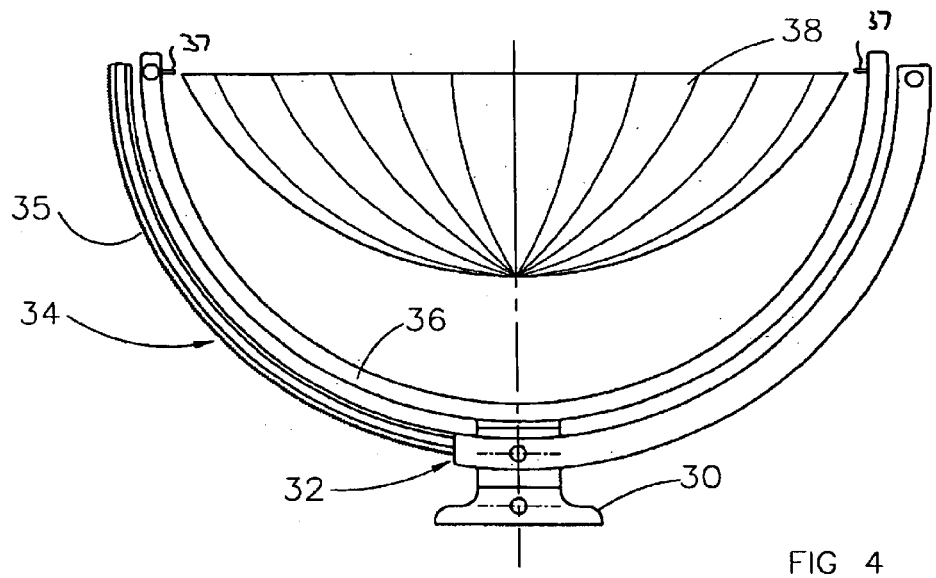
FIG. 4 is a side view of another embodiment of a moving yoke according to the invention, the moving yoke being again shown supporting a light source.
Figure 5:
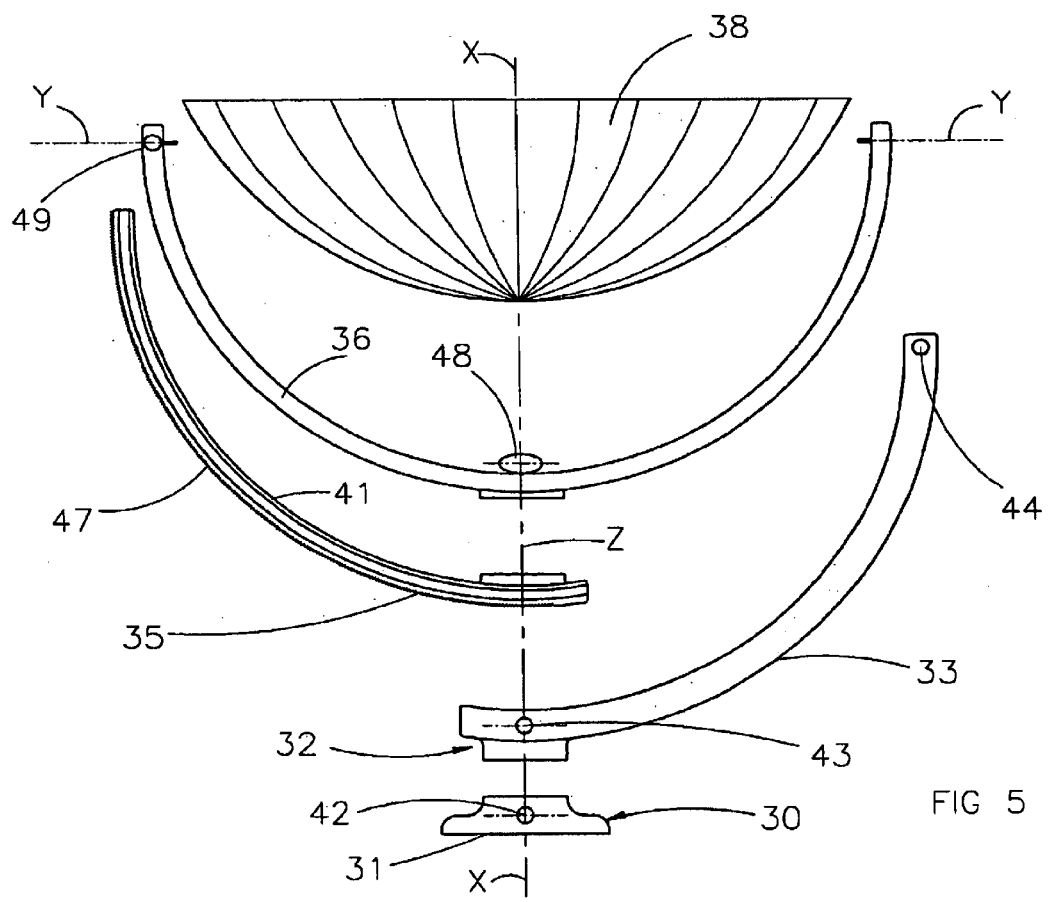
FIG. 5 is an exploded view of the moving yoke shown in FIG. 4.
Figure 6:
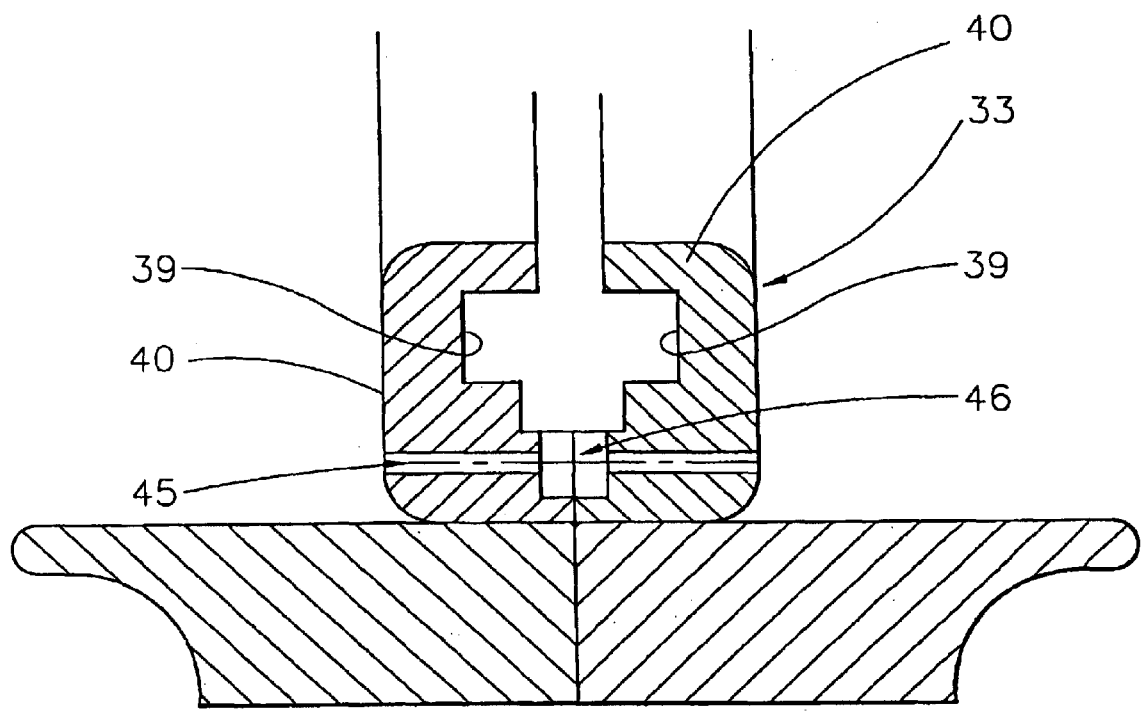
FIG. 6 is a section taken through line VI—VI of FIG. 5, on a much enlarged scale.

Referring now to FIGS. 4 to 6 of the drawings, the moving yoke shown therein comprises a first yoke member 30 having a base 31 for attaching the moving yoke to a support surface, bracket or the like.

The moving yoke also comprises a second yoke member 32 which is swivellable relative to the first yoke member 30 about a first axis X through 360°. The second yoke member includes an arcuate rocker arm 33. The rocker arm 33 extends over an angle of 90° and is connected adjacent to one end thereof to the first yoke member 30.

The moving yoke also comprises a third yoke member 34 having an arcuate slider 35, which is supported by the arcuate rocker arm 33 of the second yoke member 32 for slidable movement relative thereto along an arcuate path, and an arcuate yoke arm 36 which is rotatable relative to the slider 35 about a third axis Z and which includes support means 37 supporting a light 38 or other object for pivotable movement about a second axis Y.

The slider 35 extends over an angle of 90° and the yoke arm 36 extends over an angle of 180°. The axis of rotation Z between the slider 35 and the yoke arm 36 passes through the slider 35 at or adjacent to one end thereof and passes through the yoke arm 36 midway between its ends.

As shown in FIG. 6, the rocker arm 33 is of channel section and has guide slots 39 in opposing walls 40. The slider 35 is slidably mounted in the channel section of the rocker arm 33 and has laterally projecting, arcuately extending, guide rails 41 which co-operate with the guide slots 39. As such, the rocker arm 33 extends in parallel or substantially in parallel with the slider 35.

A first motor, shown schematically at 42, is provided to swivel the rocker arm 33 relative to the first yoke member 30. This movement is referred to later as PAN 1.

Second and third motors, shown schematically at 43 and 44, move the slider 35 relative to the rocker arm 33. The motors 43, 44 are located adjacent to opposite ends of the rocker arm 33 and rotate respective shafts mounted in respective bores 45 in the rocker arm 33 (see FIG. 6). A pinion is secured to each shaft and is located in a respective recess 46 at the bottom of the channel-shaped rocker arm 33. The pinions co-operate with a rack 47 on the base of the slider 35 to move the latter relative to the rocker arm 33.

A fourth motor, shown schematically at 48, is provided to rotate the yoke arm 36 relative to the slider 35. This movement is referred to later at PAN 2.

A fifth motor, shown schematically at 49, is provided to pivot the light 38 relative to the yoke arm 36. This movement is referred to later as TILT.

The moving yoke shown in FIGS. 4 to 6 is more versatile than that shown in FIGS. 1 to 3 and permits continuous pan, continuous tilt and continuous rotation of the light without snarling of or hindrance by power cables (not shown) supplying power from a remote source (not shown) to the moving yoke, and light in particular.

Figure 7:
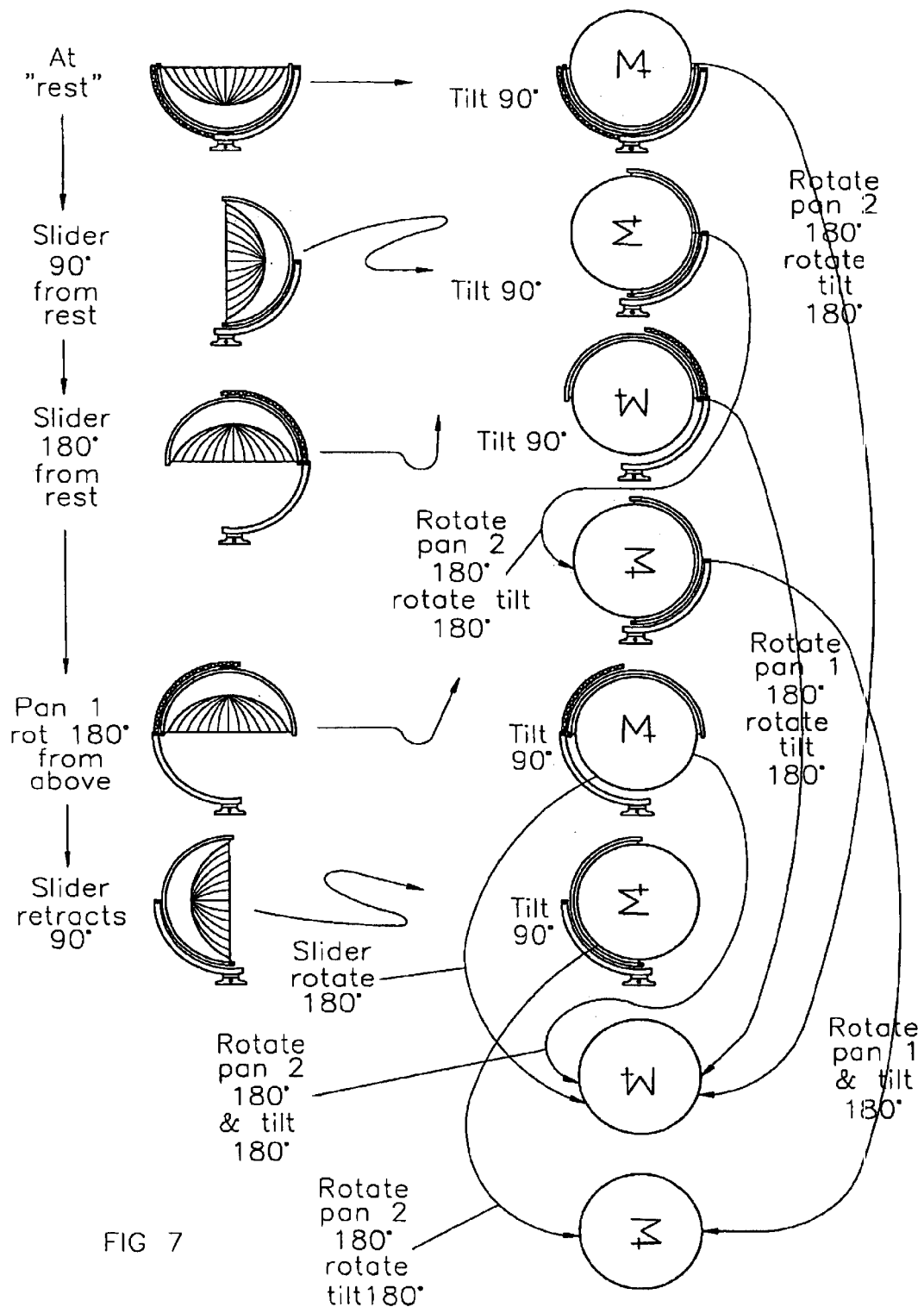
FIGS. 7 and 8 show sequences through which the yoke of FIGS. 4 to 6 can be moved.
Figure 8:
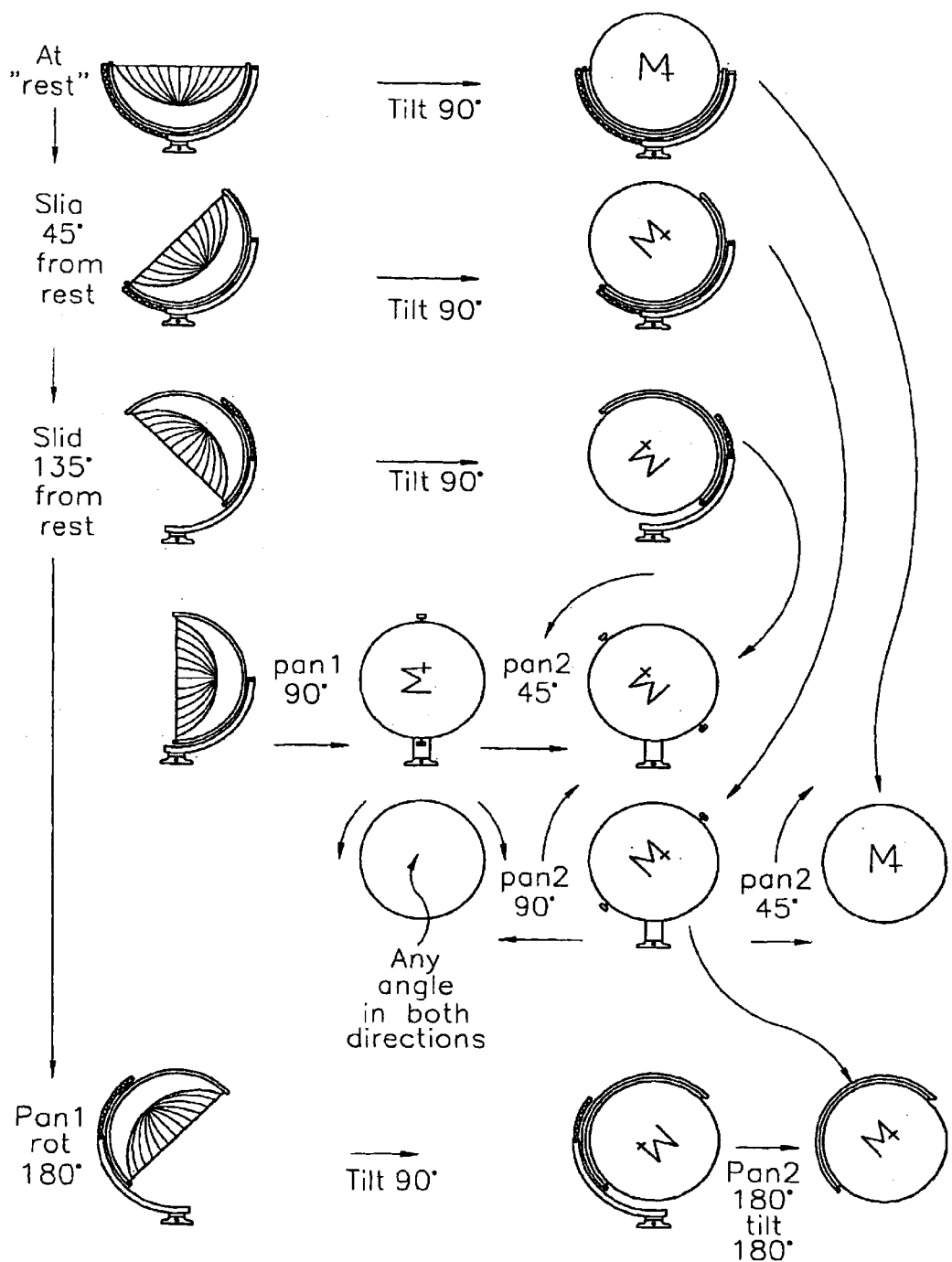

Typical sequences of movement of the yoke are shown in FIGS. 7 and 8 with the various movements described using the terms PAN 1, PAN 2 and TILT referred to above and with movements of the slider 35 relative to the rocker arm 33 being referred to using the term SLIDER.

Figure 9:
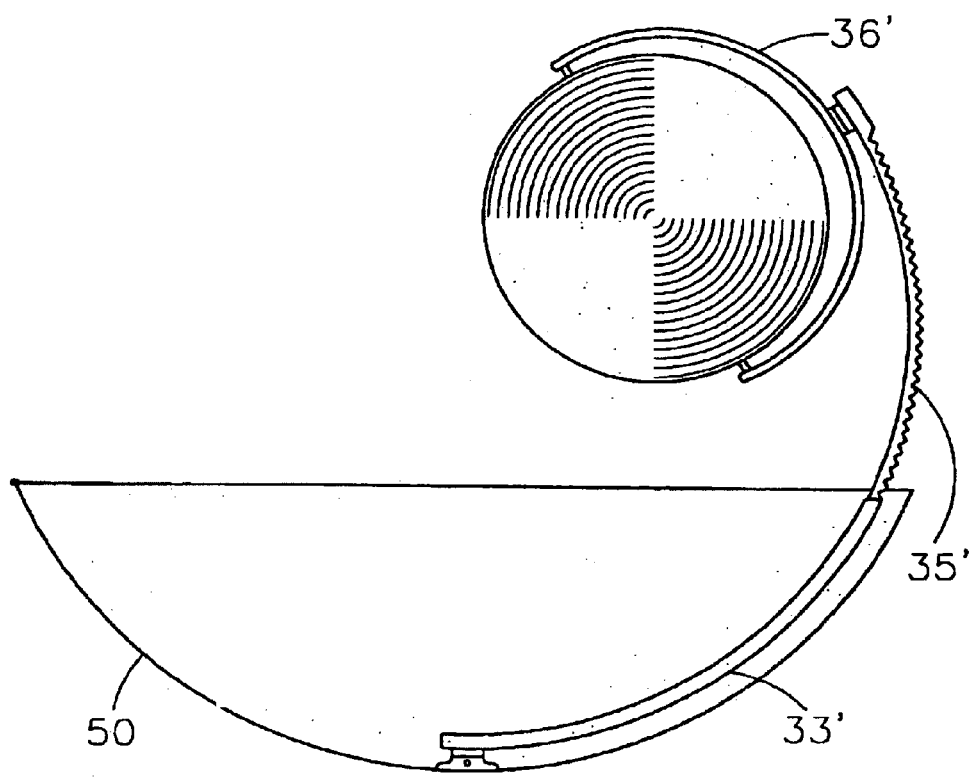
FIGS. 9a–9f are side views of yet another embodiment of a moving yoke according to the invention, mounted in a bowl.

The moving yoke shown in FIG. 9 is similar to that shown in FIGS. 4 to 6, but the yoke is mounted in a bowl 50 and the radii of the rocker arm 33' and the slider 35' are significantly greater than the radius of yoke arm 36'. The bowl 50 could be mounted, for example, in a floor, wall, roof, the side of an ocean liner, an aeroplane, a ceiling, a bathroom cabinet (with the light 38 replaced by a shaving mirror) or a unit at the foot of a hotel bed (with the light 38 replaced by a television monitor). When the yoke is stored in the bowl 50, it may be protected by an openable or removable cover. The cover could, for example, take the form of a transparent rain cover 51 formed in two parts 51a and 51b hingedly connected together.

Figure 10A:
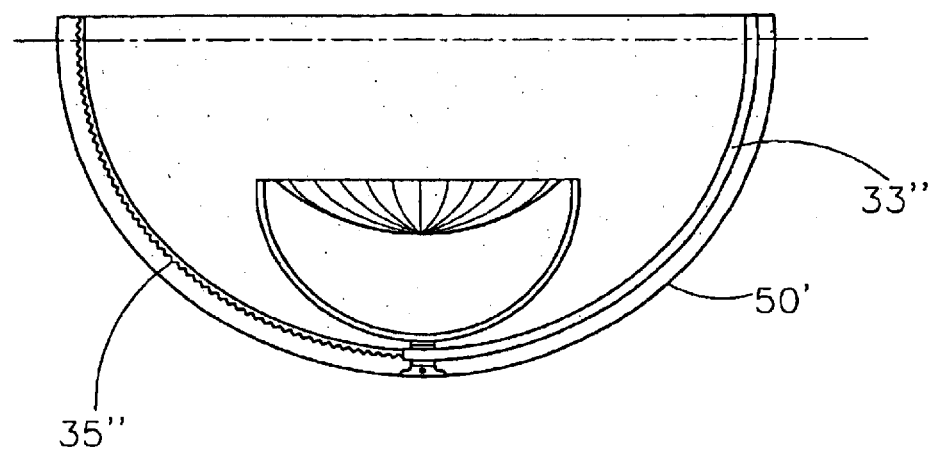
FIGS. 10a and 10b are side views of a further embodiment of a moving yoke according to the invention, mounted in a bowl.
Figure 10B:
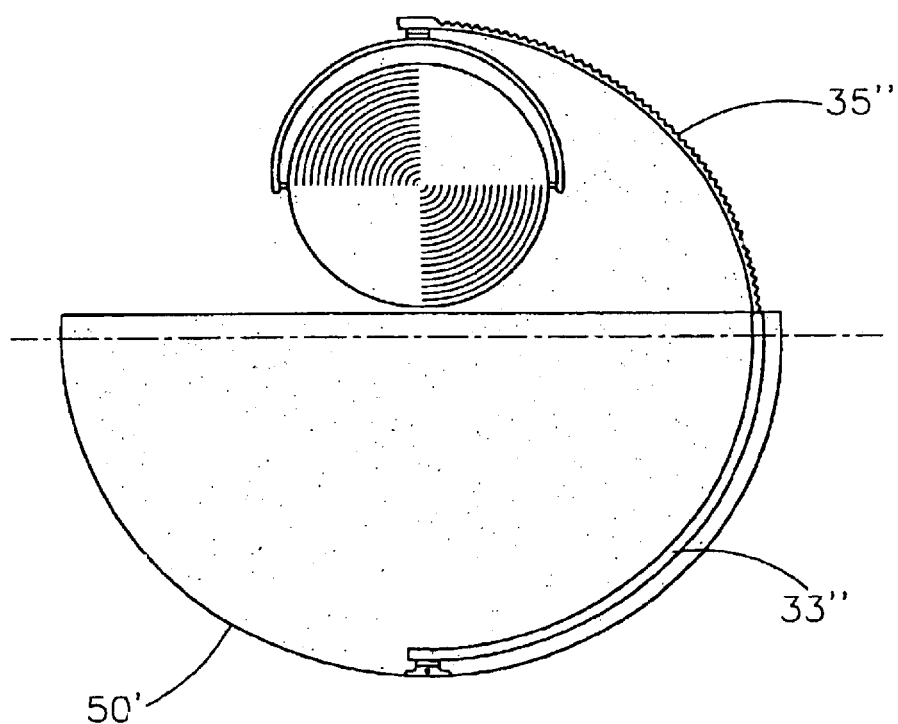

The moving yoke shown in FIG. 10 is similar to that shown in FIG. 9, but the bowl 50' is hemi-spherical, and of smaller radius, and the rocker arm 33" and the slider 35" are also of smaller radii and extend over a greater angle.

In the embodiments described with reference to FIGS. 4 to 10, it is thus possible to selectively move an output, for example a light beam output from the light 38, between any first point and any second point along either an arcuate path, a linear path or any combination thereof.

In all embodiments, the light could be supported by the slider for pivotable movement about an axis at right angles to the axis Y, instead of about the axis Y, and the light could be replaced by a mirror, television monitor or other object.

The embodiments described above are given by way of example only and various modifications will be apparent to persons skilled in the art without departing from the scope of the invention as defined by the appended claims.

What is claimed is:

1. A moving yoke assembly comprising a first yoke member, a second yoke member swivellable relative to the first yoke member about a first axis, the second yoke member having an arcuate support portion, and a third yoke member having two parts rotatable relative to one another and means for supporting an object for pivotable movement relative to the third yoke member about a second axis, one said part having an arcuate portion which is supported by the arcuate portion of the second yoke member to enable slidable movement relative thereto along an arcuate path.

2. The moving yoke assembly as claimed in claim 1, wherein the supporting means is provided on one of the two parts of the third yoke member.

3. The moving yoke assembly as claimed in claim 1, wherein the object is a light source.

4. The moving yoke assembly as claimed in claim 1, wherein the second axis is one of coaxial with and intersecting the first axis in any position of the third yoke member.

5. The moving yoke assembly as claimed in claim 1, wherein the third yoke member can be arranged in a position relative to the second yoke member such that the second axis is perpendicular to, and coplanar with, the first axis and can be moved from this position through an arcuate path of 90° in order to bring the second axis parallel to, and offset from the first axis.

6. The moving yoke assembly as claimed in claim 1, wherein the two parts of the third yoke member are rotatable relative to one another about a third axis.

7. The moving yoke assembly as claimed in claim 6, wherein the third axis is one of coaxial with and intersecting the first axis in any position of the third yoke member.

8. The moving yoke assembly according to claim 1, wherein the assembly includes power means for swivelling the second yoke member relative to the first yoke member about said first axis, for sliding the arcuate portion of the third yoke member relative to the arcuate portion of the second yoke member and for pivoting the support means about said second axis.

9. The moving yoke assembly claimed in claim 8, wherein the said power means are electrical motors.

10. The moving yoke assembly according to claim 1, wherein the third yoke member includes the arcuate rack engageable with at least one pinion gear which can be rotated to move the third yoke member relative to the second yoke member along said arcuate path.

11. The moving yoke assembly claimed in claim 10, wherein said one part of the third yoke member includes the rack and the other said part is rotatable relative to said one part.

12. A yoke assembly for object, comprising:
   a first yoke;
   an arcuate second yoke that is movable relative to said first yoke about a first axis; and
   a third yoke that includes pivots for pivotal movement of an object about a second axis, said third yoke having (a) an arcuate slider that is slideably movable relative to said second yoke along an arcuate path and (b) a yoke arm that is rotatable relative to said slider about a third axis, said pivots being at diametrically opposite points on said yoke arm.

13. The assembly of claim 12, wherein said second yoke has a C-shaped cross-section through at least 90° of arc, and wherein said arcuate slider has a first part that slides within said C-shaped cross-section and a second part that extends out of a slot defined by an open side of said C-shaped cross section and to which said yoke arm is rotatably attached.

14. A yoke assembly for a light source, comprising:
   a light source;
   a first yoke;
   an arcuate second yoke that extends through at least 90° of arc and is movable relative to said first yoke about a first axis; and
   a third yoke that includes pivots for pivotal movement of said light source about a second axis, said third yoke having (a) an arcuate slider that extends through at least 90 of arc and that is slideably movable relative to said second yoke along an arcuate path and (b) a yoke arm that extends through at least 180° of arc and that is rotatable relative to said slider about a third axis, said pivots being at diametrically opposite points on said yoke arm.

15. The assembly of claim 14, wherein said second yoke has a C-shaped cross-section through at least 90° of arc, and wherein said arcuate slider has a first part that slides within said C-shaped cross-section and a second part that extends out of a slot defined by an open side of said C-shaped cross-section and to which said yoke arm is rotatably attached.

* * * * *